US010259096B2

(12) United States Patent
Savoie et al.

(10) Patent No.: US 10,259,096 B2
(45) Date of Patent: Apr. 16, 2019

(54) BLOCKING UNIT FOR A BLOCK PIECE FOR A SPECTACLE LENS AND PROCESS OF CURING

(71) Applicant: Satisloh AG, Baar (CH)

(72) Inventors: Marc Savoie, Wetzlar (DE); Alexandre Cormier, Solms (DE); Detlef Siegert, Giessen/Wieseck (DE)

(73) Assignee: Satisloh AG, Baar (CH)

( * ) Notice: Subject to any disclaimer, the term of this patent is extended or adjusted under 35 U.S.C. 154(b) by 0 days.

(21) Appl. No.: 15/517,422

(22) PCT Filed: Sep. 21, 2015

(86) PCT No.: PCT/EP2015/071553
§ 371 (c)(1),
(2) Date: Apr. 6, 2017

(87) PCT Pub. No.: WO2016/058785
PCT Pub. Date: Apr. 21, 2016

(65) Prior Publication Data
US 2017/0304984 A1 Oct. 26, 2017

(30) Foreign Application Priority Data
Oct. 15, 2014 (EP) .................................. 14189085

(51) Int. Cl.
B24B 13/00 (2006.01)
B24B 13/005 (2006.01)
B23Q 1/54 (2006.01)

(52) U.S. Cl.
CPC ............ B24B 13/0052 (2013.01); B23Q 1/54 (2013.01)

(58) Field of Classification Search
CPC ............................. B24B 13/0052; B23Q 1/54
(Continued)

(56) References Cited

U.S. PATENT DOCUMENTS 1,952,373 A * 3/1934 Hill ..................... B24B 13/0052
451/390
3,383,808 A * 5/1968 Deshayes ............ B24B 13/0052
164/112
(Continued)

FOREIGN PATENT DOCUMENTS

EP 0 758 571 A1 2/1997
EP 1 473 116 A1 11/2004
(Continued)

OTHER PUBLICATIONS

W. Henry, "MicroLED Arrays Find Applications in the Very Small," Photonics Spectra Mar. 2013 pp. 52-55.

Primary Examiner — George B Nguyen
(74) Attorney, Agent, or Firm — 24IP Law Group; Timothy Dewitt

(57) ABSTRACT

A blocking unit for a block piece for a spectacle lens comprising a block piece reception body with a reception surface adapted to receive a block piece with a spectacle lens to be blocked and a bottom surface opposite the working surface, and a plurality of light sources fixedly mounted to the block piece reception body. A process of curing a lens on a block piece. The process comprises the steps of defining, in a controller, a pattern of illumination, and sequentially turning on and off the light sources from a plurality of first light sources and optional second light sources based on the determined pattern, for curing a material between the lens and the block piece.

19 Claims, 7 Drawing Sheets

(58) Field of Classification Search
USPC .............................................. 451/41–44, 340
See application file for complete search history.

(56) References Cited

U.S. PATENT DOCUMENTS

| | | | | |
|---|---|---|---|---|
| 3,522,677 | A | * | 8/1970 | Irwin ...................... B24B 13/00 |
| | | | | 451/42 |
| 3,663,983 | A | * | 5/1972 | Bole ................... B24B 13/0052 |
| | | | | 425/169 |
| 3,804,153 | A | * | 4/1974 | Tagnon ............... B24B 13/0055 |
| | | | | 164/332 |
| 3,866,667 | A | * | 2/1975 | Knight ..................... B23Q 1/54 |
| | | | | 164/334 |
| 5,503,694 | A | * | 4/1996 | Abrams ............. B29C 65/7841 |
| | | | | 156/272.2 |
| 5,906,533 | A | * | 5/1999 | Harris .................. B24B 37/345 |
| | | | | 257/E21.23 |
| 8,616,150 | B2 | | 12/2013 | Savoie |
| 2004/0238111 | A1 | | 12/2004 | Siegel |
| 2011/0067628 | A1 | | 3/2011 | Savoie |

FOREIGN PATENT DOCUMENTS

| | | |
|---|---|---|
| EP | 1 593 458 A2 | 11/2005 |
| EP | 1 698 432 A2 | 9/2006 |
| EP | 1 719 585 A2 | 11/2006 |
| EP | 2 011 604 A1 | 1/2009 |
| EP | 2 266 753 A1 | 12/2010 |
| WO | 2003006387 A2 | 1/2003 |
| WO | 03096387 A2 | 11/2003 |
| WO | 20040058452 | 7/2004 |
| WO | 2005/068510 | 7/2005 |
| WO | 2009/135689 | 11/2009 |
| WO | 2010/111121 | 9/2010 |
| WO | 20101/05365 | 9/2010 |
| WO | 2013/088021 A1 | 6/2013 |
| WO | 2015-197970 A1 | 12/2015 |

* cited by examiner

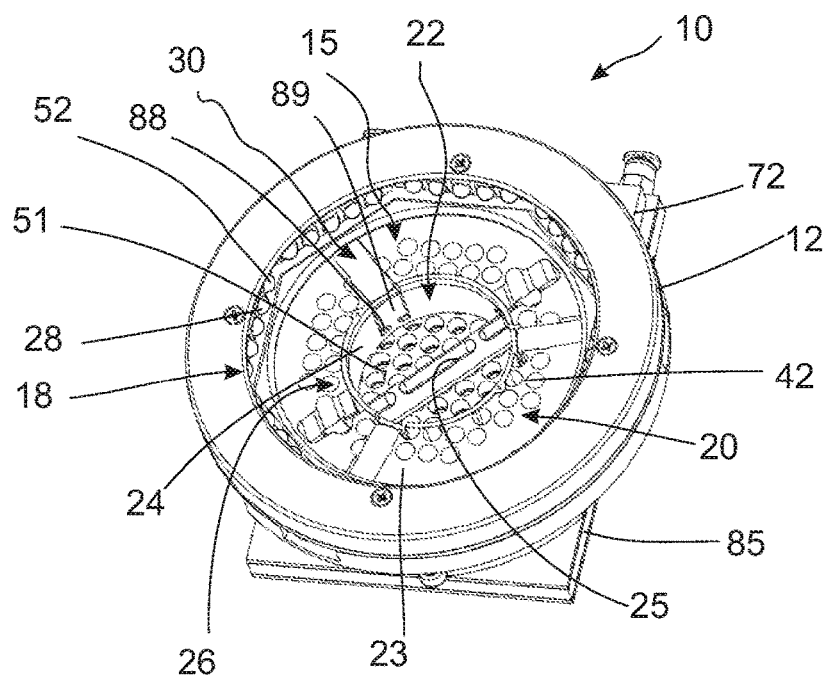
Fig. 1
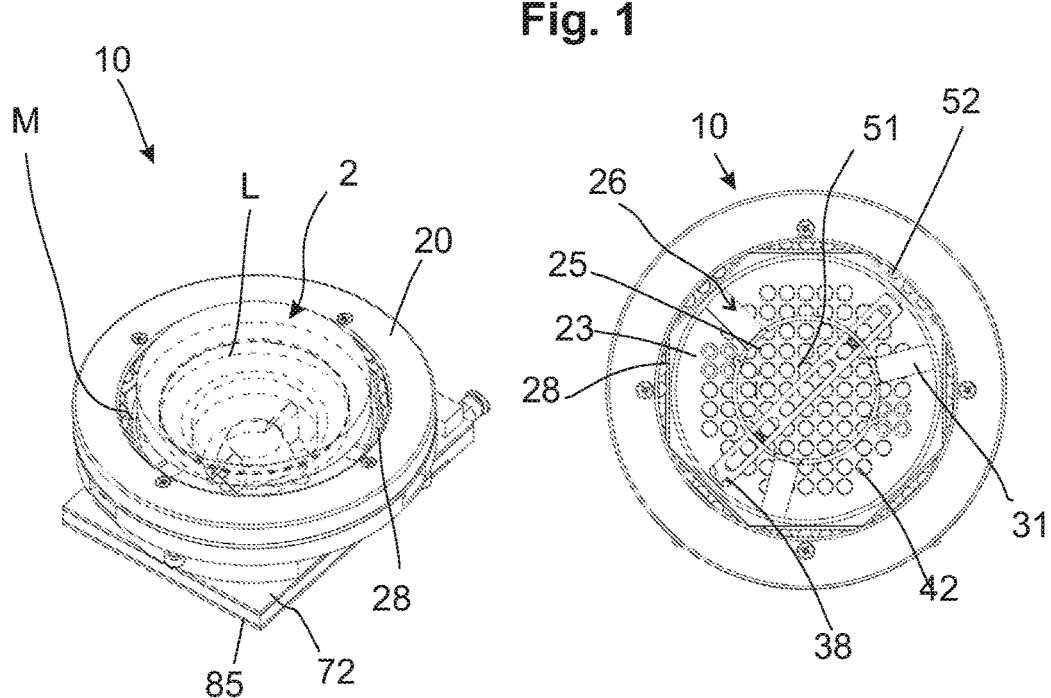
Fig. 3
Fig. 2

BLOCKING UNIT FOR A BLOCK PIECE FOR A SPECTACLE LENS AND PROCESS OF CURING

TECHNICAL FIELD OF THE INVENTION

The present invention generally relates to a blocking method and to a blocking unit for a block piece for a spectacle lens or a blocking unit for a workpiece support for supporting an optical workpiece during the processing thereof. In particular, the invention relates to blocking unit for a block piece for holding a spectacle lens for processing thereof, as used in prescription workshops in masses, that is to say production workshops for manufacturing individual spectacle lenses from customary materials (mineral glass, polycarbonate, PMMA, CR 39, HI index, etc.) according to a prescription. The invention also concerns a method for curing an adhesive to block a spectacle lens blank onto a block piece during the manufacturing of a spectacle lens according to a prescription.

BACKGROUND OF THE INVENTION AND PRIOR ART

An ophthalmic lens blank generally has a first face with a predetermined curvature and a second face and an outer edge. The second face is opposite the first face on which a desired surface contour is generated by a machining process. The overall process is generally referred to as "lens surfacing" and the overall object is to yield a finished spectacle lens so that the first and second face curvatures cooperate to yield desired optical properties. The first and/or second faces of the lens are usually coated to provide the finished spectacle lens with an enhanced ability to resist scratching (by means of a "hard coating"), with a low residual reflection and a desired color (by means of an "antireflection coating"), and/or with certain surface properties such as hydrophobic, oleophobic and dust repelling properties (by means of a "top coating"). Usually also a further machining process takes place (the so-called "edging"), the aim of which is to finish-machine the edge of the spectacle lens in such a way that the spectacle lens may be inserted into a spectacle frame. In all these process steps the spectacle lens (blank) must somehow be held in the machining machine(s) and coating apparatus respectively.

In more detail, hitherto the following main process steps are usually carried out in prescription workshops: Firstly, a suitable right and/or left ophthalmic lens blank is removed from a semifinished product inventory. The term "semifinished" is used to mean that the spectacle lens blanks, which are usually round or oval in plan view and have not yet been edged, have already been molded, machined or in another way contoured (surfaced) on one of their two optically active faces only. The spectacle lens blanks are then prepared for the blocking operation, namely by applying a suitable protective film or a suitable protective lacquer to protect the optically active face which has already been machined or contoured, i.e. the first face or blocking face.

The so-called "blocking" of the ophthalmic lens blanks then takes place. During this operation, the spectacle lens blank is joined to a suitable block piece, for example a lens block according to German standard DIN 58766, EP 1 593 458 A2 or document EP 2 266 753 A1. To this end, the block piece is firstly brought into a predefined position with respect to the protected first face of the spectacle lens blank, and then in this position the space between block piece and spectacle lens blank is filled with a molten material (normally a metal alloy or wax) or an adhesive composition that is curable, e.g., by UV or visible light, as described in the earlier European patent application EP 2 011 604 A1 by the same applicant for instance. Once this material has solidified or cured, the block piece forms a holder or support for machining the second face of the spectacle lens blank. The block piece is grasped by a chuck or other suitable coupling means during lens generation to provide in particular secure mounting to the profiling machine while avoiding damage to the lens.

Lens surfacing is carried out using profiling machines which typically have a cutter of some type that is moved across the second face of the ophthalmic lens blank to give the second face its macrogeometry according to the prescription. The spectacle lens blank may be stationary or rotating during the cutting operation, depending on the particular profiling generator (which is) being used. Typical machining processes for surfacing spectacle lenses include single point diamond turning (as the presently preferred fine cutting process for plastic materials and described in, e.g., document EP 1 719 585 A2 by the same applicant), diamond tool milling (as the presently preferred rough cutting process for plastic materials and described in, e.g., document EP 0 758 571 A1 by the same applicant), and grinding processes, applied depending on the lens material.

Usually fine machining of the ophthalmic lenses then takes place, in which the pre-machined second face of the respective spectacle lens blank is given the desired microgeometry, as described, e.g., in documents EP 1 473 116 A1 and EP 1 698 432 A2 by the same applicant. Depending on inter alia the material of the spectacle lenses, the fine machining process is divided into a fine grinding operation and a subsequent polishing operation, or includes only a polishing operation if a polishable second face has already been produced during the pre-machining stage.

Only after the polishing operation, cleaning steps are carried out. Then the coating process(es) take(s) place that, depending on among other things the material of the lens blank, may include spin (or dip) coating of the spectacle lens blank so as to provide at least the second face of the lens blank with a hard coating or the like, as described, e.g., in the earlier U.S. patent application Ser. No. 11/502,306, wherein the spectacle lens blank is held in the spin coating apparatus by means of a lens holder that has a suction cup for instance.

After the coating step(s) the ophthalmic lens blank usually is edged so that the spectacle lens can be inserted into a spectacle frame. Finally, after edging the spectacle lens is cleaned again and ready for inspection and insertion into/mounting to the spectacle frame.

Document WO 2009/135689 teaches a device for blocking workpieces, particularly spectacle lenses, for the processing and/or the coating thereof. The device comprises a support for supporting the workpiece, an exposure device for exposing light to the blocking material for curing, from below the transparent block piece by an ultraviolet light source.

A UV light source for the curing stage is described in document WO 03/096 387 A2. A UV light source is associated with a lens block support for directing light through the lens block, which is in a material capable of transmitting at least the UV light. UV light is generated by the UV light source and transmitted through the lens block at a given wavelength, intensity and for a duration sufficient to cause the adhesive to cure, thereby bonding the lens blank to the block piece.

In this process, the lens blank, the adhesive and the block piece are cured together, which means that assembly formed by the lens blank, the adhesive and the block piece "freezes" together as a monolithic assembly. The polymerisation during curing induces shrinkage and thermal expansion from the chemical reaction. The increase in the temperature causes internal stresses in final assembly.

Shrinkage in turn may bend/distort or even shift with respect to the block piece the blocked lens blank so that the curve which is cut into the second surface of the lens may become distorted when the processed lens is deblocked from the block piece and resumes its natural shape. Different adhesive compositions have been developed in order to reduce the shrinkage and thermal expansion resulting from the exothermic reaction.

However, there remains room for improving the curing process, in particular for reducing the shrinkage resulting from the polymerisation.

OBJECT OF THE INVENTION

It is an object of the invention to improve the blocking process, in particular to reduce shrinkage during curing of the adhesive used for blocking.

SUMMARY OF THE INVENTION

The above object is solved by a blocking unit according to claim 1 and a method of curing according to claim 12. The blocking unit for a block piece for a spectacle lens according to the invention comprises a block piece reception body with a reception surface adapted to receive a block piece with a spectacle lens to be blocked and a bottom surface opposite the working surface and a plurality of light sources fixedly mounted to the block piece reception body.

By providing a plurality of light sources mounted to the block piece reception body, a compact system may be obtained and an efficient illumination system, the light sources being in close proximity to the material to be cured. This can help reduce interferences due to undue reflections when the light sources are independent from the block piece reception body.

In an aspect of the disclosure, the blocking unit comprises a controller for individually controlling the light sources of the plurality of light sources. The controller can set a starting time, duration and intensity of illumination, for each one of the plurality of light sources, and therefore irradiating the material to be cured according to a pattern of illumination. The pattern of illumination may be defined to minimize shrinkage and stresses induced during curing and/or to speed up the process. Different parameters may be taken into account when determining the pattern of illumination, including but not limited thereto geometrical parameters such as the geometry of the lens, the geometry of the block piece, a thickness profile of the material to cure, as well as optical parameters such as a nature of the material to cure, the absorption properties of the block piece, lens and adhesive parameters. For example, the absorption properties of the lens have an influence on the light intensity required for curing the material, e.g. a dark sun glasses absorb a high amount of UV and reflect less UV light on the material to cure than uncolored glasses. The geometry and curvature influence as well the required illumination, in particular at the edges.

The blocking unit in an aspect of the disclosure comprises a support, and the block piece reception body and at least a first group of the plurality of light sources are mounted to the support. The support is preferably a printed circuit board (PCB) to which the light sources can be mounted. The light sources and the block piece reception body thereby form a single curing unit.

In an aspect of the disclosure, the light sources are Light Emitting Diode (LED) light sources. LED light sources can be addressed and controlled individually, in particular the intensity and duration of illumination can be controlled. LED light sources may be used in a required wavelength range needed for the curing.

In an aspect of the disclosure, the plurality of light sources comprises a first group of first light sources arranged at the bottom of the block piece reception body, and the first light sources are arranged to irradiate in a direction mainly vertical to the bottom surface, towards the reception surface. The first group of first light sources may be mounted on the support, at the bottom of the block piece reception body, to cure the material to be cured on the block piece.

In an aspect of the disclosure, a second group of light sources arranged to irradiate towards the top of the block piece, wherein the second light sources are arranged to irradiate in a direction mainly parallel to the bottom surface, towards the center of the blocking unit. By providing light sources arranged to irradiate in a radial direction, towards a center of the blocking unit, the curing of the external layers of the curing material can be improved. Indeed, when curing by irradiating by the first light source, it has been shown that the curing is less efficient for the material in contact with oxygen. The reason is that the adhesive which is or was in contact with oxygen is less reactive and does not polymerize sufficiently. The oxygen acts as an inhibitor that is catching radicals that are triggering the polymerization. As a result, a sticky surface of uncured monomers at the outer edge of the adhesive can be observed. These uncured monomers will not react sufficiently and connect to the matrix of the adhesive. They will remain on the lens after processing and deblocking and thus can lead to undue contamination in the cleaning and coating steps at the end of the lens processing procedures. The plurality of second light sources, at the top of the reception body, irradiate additional UV light directly in radial direction. The photons of this additional UV radiation cause the photoinitiators contained in the adhesive to produce new radicals that trigger a polymerization of the uncured monomer and link it to the matrix of the already cured adhesive. Thus the surface of the lens remains clean and is free of remaining adhesive after deblocking.

The second group of light sources may be integrated in the block piece reception body, on an internal circumference peripheral wall above the reception surface.

Cooling elements may be provided to prevent overheating of the blocking unit, in particular to prevent overheating of the light sources. In particular, a cooling plate mounted to the support may be used for cooling of the blocking unit. A cooling paste may be provided between the second light sources and the cooling plate, to help dissipate the heat generated by the second light sources when used.

In a further aspect of the disclosure, the block piece reception body comprises a plurality of through-holes, the through holes being arranged between the bottom surface and the reception surface, in particular being arranged to guide light emitted from the first group of light sources. Accordingly, the light emitted from the light sources may be directed to the zones of material to be cured, preventing undue reflections which would otherwise affect the curing.

In an aspect of the disclosure, the block piece reception body comprises an inter-changeable insert for receiving block piece types of different standards and/or shapes.

The present invention also proposes a process of curing a lens on a block piece, comprising the steps of defining, in a controller, a pattern of illumination, and sequentially turning on and off the light sources from a plurality of first light sources and optional second light sources based on the determined pattern, for curing a material between the lens and the block piece, wherein the first light sources and second light sources are individually controllable by the controller.

In an aspect of the disclosure, the process comprises first turning on first light sources located around, close or in the center of the blocking unit and sequentially turning on the neighbouring light sources in the outward direction.

In yet another aspect of the disclosure, the process comprises first turning on first light sources located on one side of the blocking unit and then sequentially turning on the neighbouring light sources towards the other side of the blocking unit.

Preferably, the pattern of illumination depends on at least one of a geometry of the lens, a tinting or gradient tinting of the lens, a gradient of thickness of the lens, a thickness of the curing material, a gradient of thickness of the curing material, a composition of the curing material.

In an aspect of the disclosure, the defining of the pattern comprises determining a sequence controlled in time and intensity which depends on at least one of a geometry of the lens, the refractive index of the lens, the thickness profile of the curing material, the refractive index of the curing material and the refractive index and transmission of the blockpiece and lens. The radius and the tinting of the blank determines the percentage of UV light that is being reflected back into the adhesive. Thus steep curved sunglass blanks require much more intense UV radiation especially at the outer diameter of the blank. If the refractive indices of the adhesive and the blank are very different, this effect is even more intense. Such combinations require at least locally more curing energy respectively more intense exposure to UV radiation. The pattern of illumination can be defined to minimize shrinkage and stresses induced during curing.

Further effects and advantages of the proposed blocking unit and a related method for blocking spectacle lenses according to a prescription will become apparent to the skilled person from the following description of currently preferred examples of embodiment of the invention.

BRIEF DESCRIPTION OF THE DRAWINGS

Herein below, the invention will be explained in more detail on the basis of preferred examples of embodiments and with reference to the appended, partially schematic drawings. In the drawings:

FIG. 1 shows schematically a blocking unit according to a first embodiment of the present invention, FIG. 2 shows a top view of the blocking unit of FIG. 1, FIG. 3 shows the blocking unit of FIGS. 1 and 2 with a block piece, blocking material and lens inserted therein.

Figure 4:
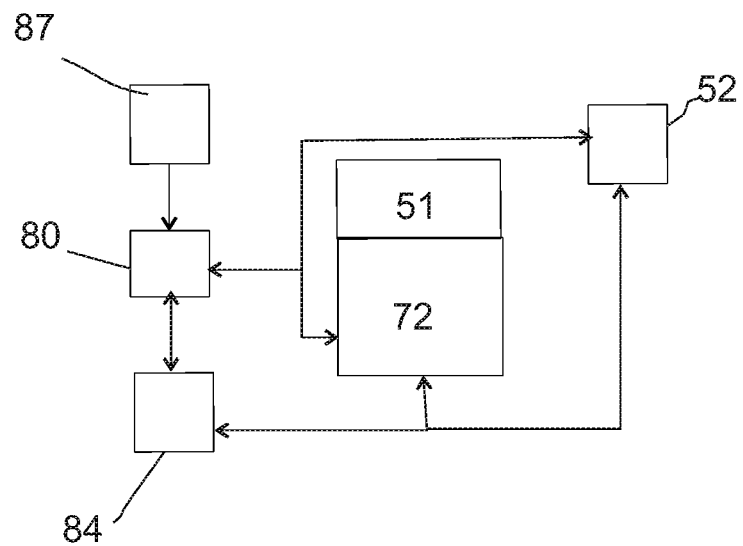
FIG. 4 shows a block diagram of a control unit for a blocking unit according to an embodiment of the present invention.

Preferred embodiments of the present invention will now be described in more detail, wherein it is to be noted that the following description is given for illustrative purposes, only and not with the intention to restrict the scope of protection to any of the illustrated and discussed preferred embodiments. In particular, the person skilled in the art will be well aware that any single feature described in detail with respect to one preferred embodiment could also be used separately from features described in the same embodiment or in combination with features of another embodiment. Furthermore, it should be understood that all given indicia as to material choices, sizes, measures and the like are as well to be considered as examples only, and if any of them would prove to be an essential feature again such feature should be considered as distinguishing if taken separately or in conjunction with other features described herein, irrespective as to whether such feature combination is explicitly mentioned or rather obtainable by omitting one or more single/isolated feature(s) from any of the described embodiments.

FIGS. 1-3, and 5 show a blocking unit 10 in which a spectacle lens can be blocked on a block piece 2 (FIG. 2) with a temporarily deformable material, according to an aspect of the present invention. Identical elements are labelled with the same reference on FIGS. 1-5.

The temporarily deformable material M is preferably an adhesive material which can be cured by light, as is known in the art.

The blocking unit 10 comprises a reception body 20 mounted on a support 72. The reception body 20 comprises a bottom portion 12, a reception part 15 with a reception surface 22 for receiving the block piece 2 and a top part 18.

The reception surface 22 is a stepped surface, with a lower central reception surface 25 and an upper peripheral reception surface 23, linked by a transition surface 24 mainly orthogonal to the lower central reception surface 25 and the upper peripheral reception surface 23. The upper peripheral reception surface 23 is concentrically arranged with but at a distance from the lower central reception surface 25. The top part 18 comprises a top peripheral wall 28, extending from the outside periphery of the upper peripheral reception surface 23.

The reception body 20 forms a reception space 26 for the block piece, when inserted in the blocking unit, resting on the reception surface and being surrounded by the top peripheral wall 28.

Figure 5:
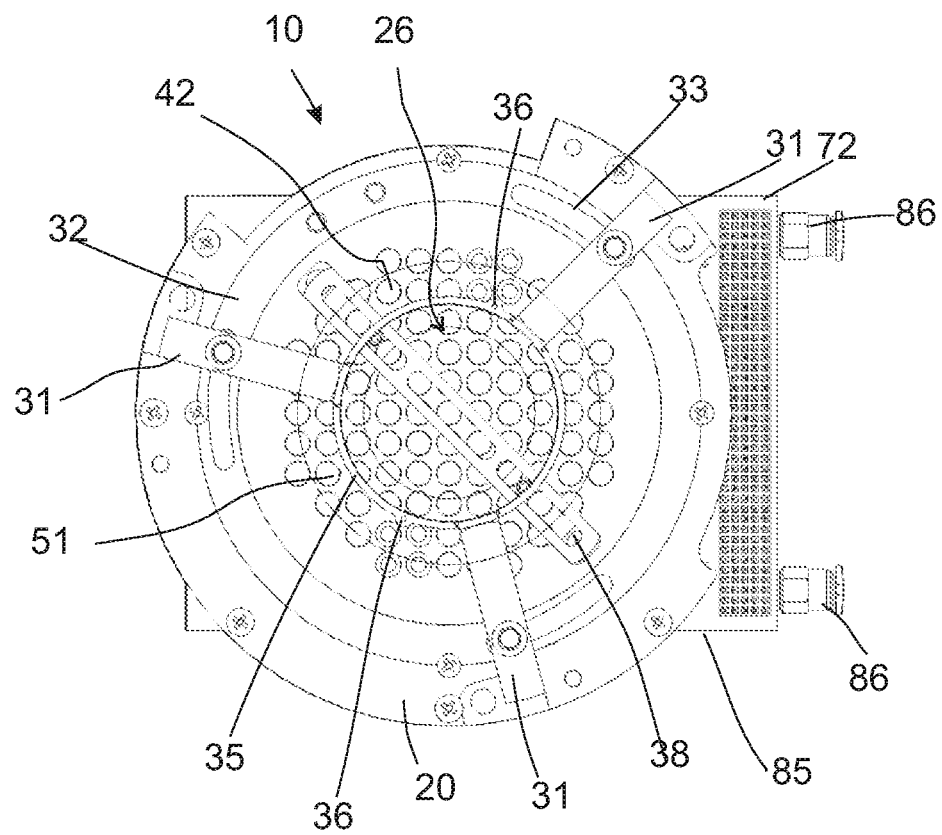
FIG. 5 shows schematically a clamping mechanism of the blocking unit of FIG. 1 of the present invention.
Figure 7A:
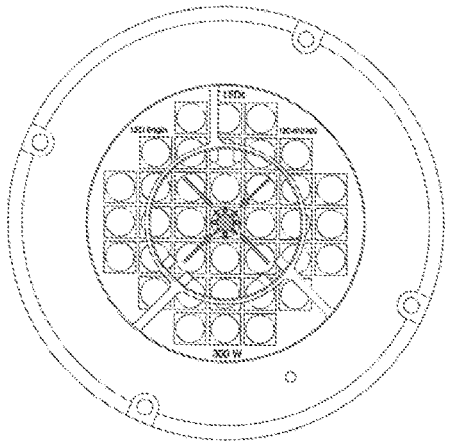
FIGS. 7a-7h shows the blocking unit during a curing process according to an embodiment of the present invention.
Figure 7B:
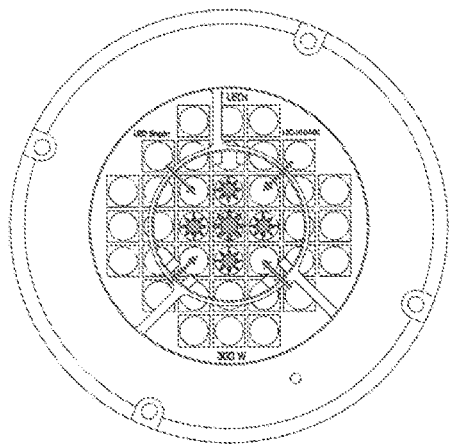
Figure 7C:
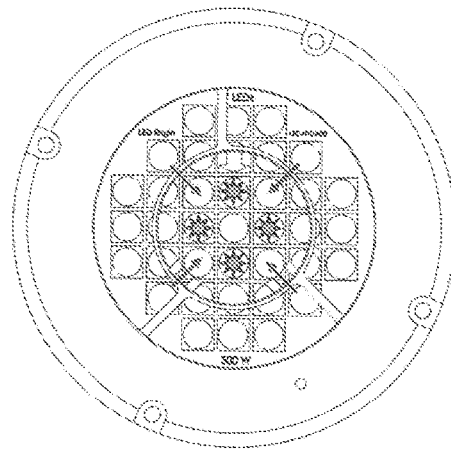
Figure 7D:
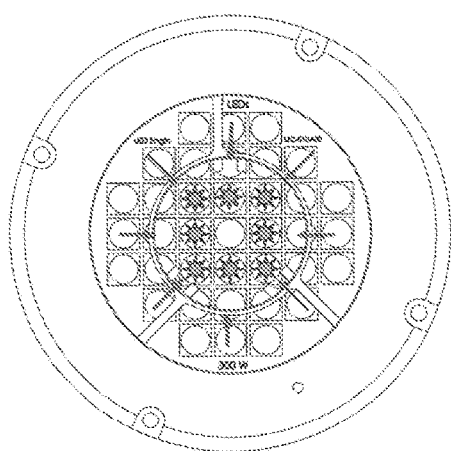
Figure 7E:
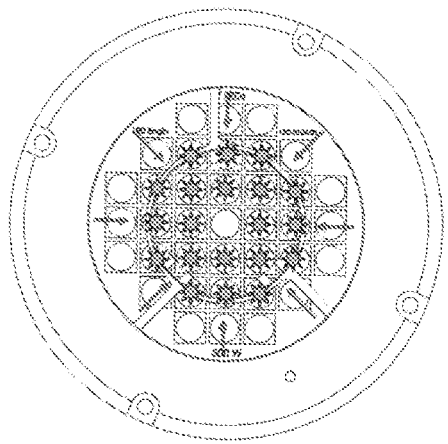
Figure 7F:
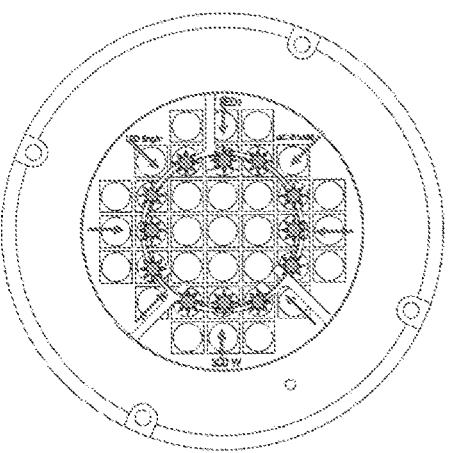
Figure 7G:
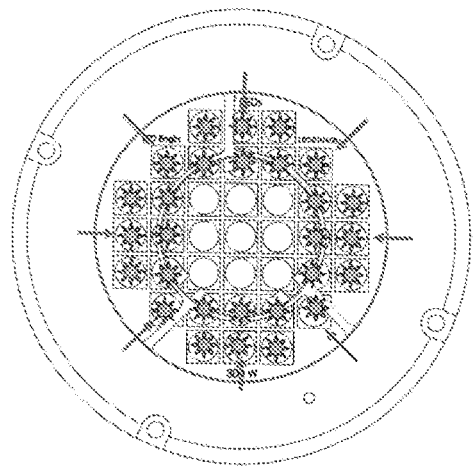
Figure 7H:
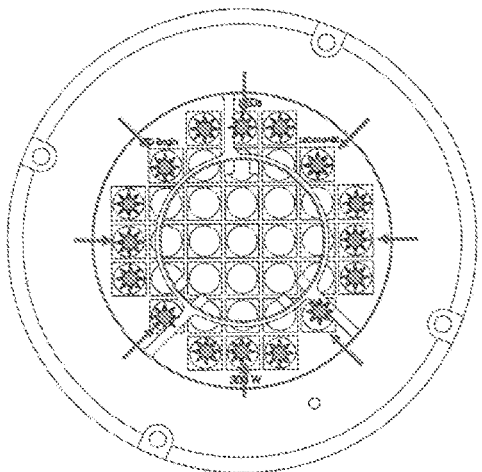
Figure 8A:
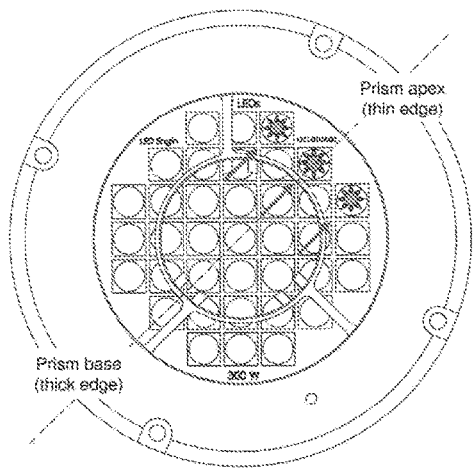
FIGS. 8a-8h shows the blocking unit during a curing process according to another embodiment of the present invention.
Figure 8B:
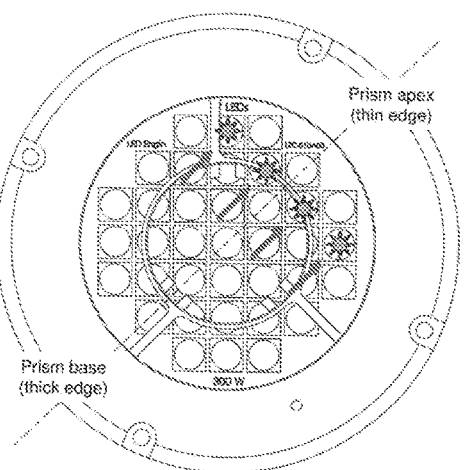
Figure 8C:
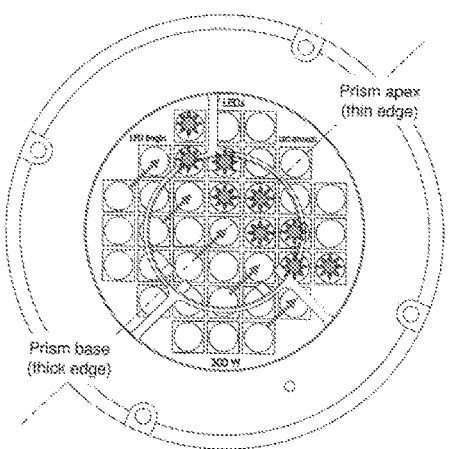
Figure 8D:
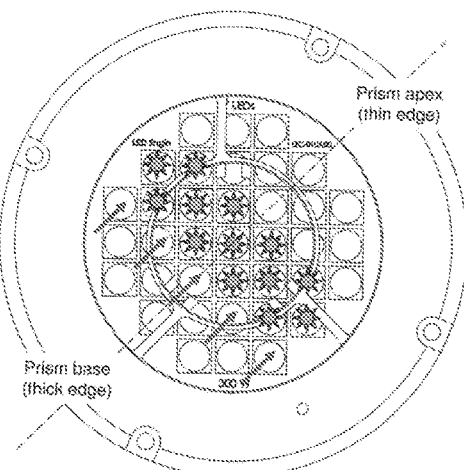
Figure 8E:
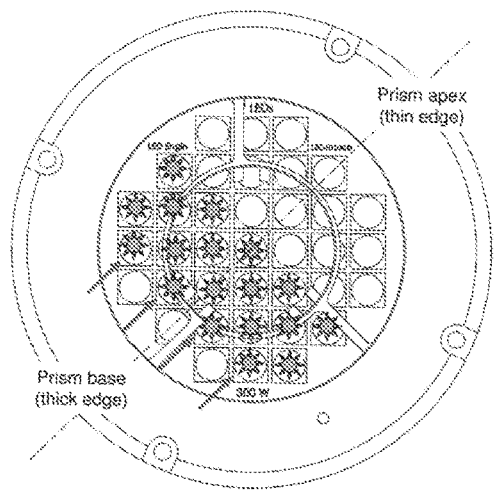
Figure 8F:
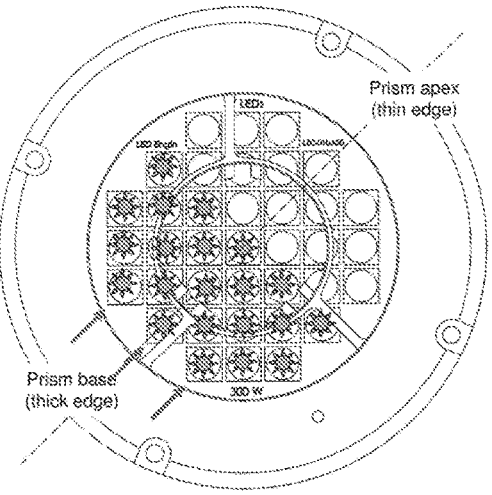
Figure 8G:
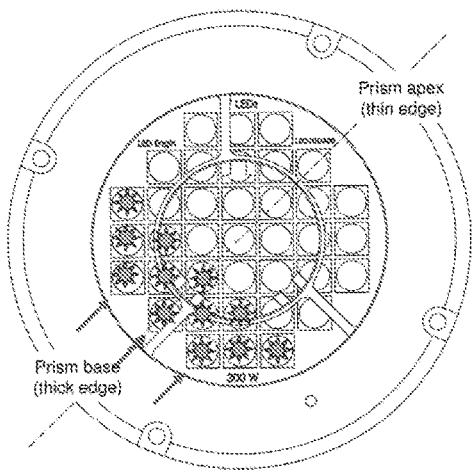
Figure 8H:
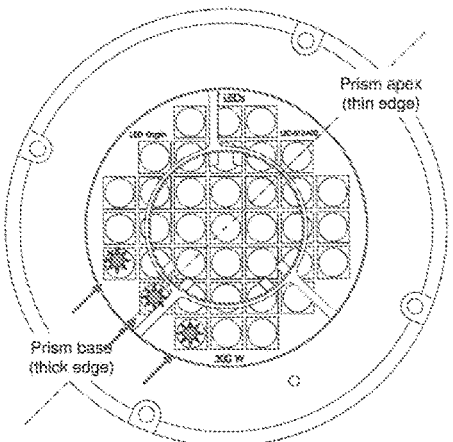

A removable insert in form of an adapter ring 35 for the positioning and fixation of the block piece may be provided (best seen on FIG. 5). The adapter ring 35 can be chosen to correspond to the block piece's geometry and for positioning the block piece in the reception body 20. The adapter ring 35 can be fitted in the reception space 26.

The reception body 20 is provided with a clamping mechanism 30. The clamping mechanism 30 is best seen on FIG. 5. The clamping mechanism 30 comprises clamping portions 31 at a lower portion of the reception body 20 via which the block piece with the spectacle lens blank blocked on it can be fixed in a machine or an apparatus for processing (i.e. surfacing, cleaning, tinting, coating, edging, etc. as the case may be) of the spectacle lens blank. The clamping portions 31 are arranged with a clamping ring 32, which comprises corresponding guiding notches 33 oriented radially towards the inside. In the example of FIG. 5 there are three clamping portions 31 cooperating with three guiding notches 33. However, this is not limiting the invention.

The clamping ring 32 may be turned by a motor or pneumatically by an actuation arm driven by an air cylinder (not shown). This brings the clamping portions 31 to move radially towards the inside and to clamp the adapter ring 35 together with the block piece inserted in the block station. The adapter ring itself is provided with longitudinal slots 88 that form elastic clamping tabs 89 (see FIG. 1). Preferably, the adapter ring has six longitudinal slots forming three flexible clamping tabs. These allow a clamping of block pieces, having a clamping diameter of 43 mm according to the DIN standard 58766.

An axis alignment bar 38 is provided in the blocking unit 10 for the correct angular positioning of the block piece inserted therein. The axis alignment bar 38 interacts with a V groove provided on the block piece.

The blocking unit of FIG. 5 is configured to block a block piece following DIN 58766 standard or a so called Satisloh "ART" block piece configuration or a so called Satisloh "Nucleo" block piece such as described in the commonly owned patent application EP 2 266 753. For fitting aNucleo block piece the axis alignment bar 38 can be removed and the adapter ring 35 can be replaced by a very similar fixation ring (not shown). The fixation ring has basically the same outer shape as the adapter ring 35, but is not provided with the longitudinal slots described above. Thus the fixation ring is not provided with the flexible clamping tabs. Instead, the fixation ring is provided with three clamps oriented radially inside and designed to align with three corresponding fixation tabs of the Nucleo block piece. Both the fixation ring and the adapter ring 35 can be fixed using i.e. two screws.

The adapter ring 35, or the fixation ring, comprises at least one, preferably two opposite air holes 36, arranged at the bottom of the reception space 26, under low air pressure, which are arranged to detect a back pressure via a pressure monitor, as soon as the block piece is firmly and correctly inserted into the reception body 20 and touches the air holes 36. This arrangement ensures a correct positioning when the block piece is properly positioned in the reception body.

A first plurality of light sources 51 is mounted on the bottom portion 12, on the support 72 in form of a PCB (Printed Circuit Board). The first plurality of light sources 51 is arranged to emit light towards the reception surface 22.

A second plurality of optional second light sources 52 is arranged in the top part 18, in said top peripheral wall 28 (not shown on FIG. 5). The second plurality of second light sources 52 is arranged to emit light in an inner radial direction, i.e. towards the inside of the reception body 20.

The second light sources 52 are spaced apart along the periphery wall 28, forming a ring of light sources. The second light sources 52 may be arranged at regular intervals or may be arranged at irregular intervals along the top peripheral wall 28. In the example of FIGS. 1-3, the second light sources 52 are spaced along the entire periphery wall.

The first and second light sources 51, 52 can be formed as LED designed to emit in the wavelengths used for curing the material M between the block piece and the lens.

The light sources 51 may be mounted on a support 72 with cooling means 85, as explained later with reference to FIG. 4.

The reception body 20 comprises a plurality of through-holes 42 arranged between the bottom 12 and the reception surface 22, at locations corresponding to locations of the first light sources 51. The through-holes 42 are parallel to each other and preferably arranged orthogonal to the lower reception surface 25. The through-holes 42 may form light channels directing the light from the first light sources 51 through to the reception surface 22 and hence to chosen area of irradiation and curing.

The through-holes 42 may be mirror coated or silvered internal cavities to better guide the light, in an aspect of the disclosure.

Focusing or diffusing means may be provided to direct the light emitted from the light sources. In a non limiting example, the light sources are provided with condenser lenses, preferably hemispherical lenses. In another non limiting example, the upper ends of the light pipes can be designed as optical elements to focus or diffuse the light being emitted.

The reception body can be made of acrylic, which enables avoiding shadows. Another non limiting example is to form the light guides by drilling the through holes in the reception body from the bottom towards the body. The reception body 20 can be made of aluminum, which enables an efficient cooling of the light sources. The aluminum reception body 20 may be connected to the light sources support 72 and their cooling means 85 by means of a heat transfer paste.

The first and second light sources 51, 52 are independently and individually controllable or addressable. A controller 80 (FIG. 4) is provided which is configured for controlling the switching on and off the light sources, as will be described with reference to FIGS. 6 to 8.

The controller 80 can control the first and second light sources 51, 52 depending on or using a predetermined pattern of illumination, e.g. sequence, duration and intensity of illumination. The pattern may be based on at least one of a geometry of the lens, the reception surface (radius) of the block piece, a thickness profile of the curing material across the entire blocking area, a gradient of thickness of the lens, a possible tinting of the lens (i.e. uniform, gradient or photochromic tinting, that will affect the reflection and absorption of the UV rays hitting the boundary between the adhesive and the lens surface), a gradient of thickness of the curing material, a composition of the curing material. The refractive indices of the block piece, adhesive and blank as well as the UV-absorption of the block piece may also influence the local illumination intensity and duration.

A distance between the light sources and the block piece may be in a range of about 15 to 50 mm, preferably 30 to 40 mm.

The controller 80 is connected to the main support 72 at the bottom portion 12 of the reception body 20. The controller 80 can command the plurality of first light sources 51. The controller 80 is also connected to the second plurality of second light sources 52. The controller 80 can command the plurality of second light sources 52.

A thermal management unit 84 is further provided, for managing the cooling of the blocking unit 10. The thermal management unit 84 may comprise a cooling plate 85 with cooling water as known in the art. The plurality of light sources 51 mounted on the bottom portion 12 may dissipate the heat via the cooling plate 85 mounted on a bottom side of the bottom portion 12. The cooling plate may be provided with canals wherein water may flow through via the coolant connections 86 for thermal exchanges and heat dissipation (see FIG. 5). Indeed, the curing time, i.e. the duration of illumination of each of the plurality of light sources, may be as long as necessary, which may lead to a high illumination intensity. This could result in overheating of the LEDs and the blocking unit 10.

A power supply 87 is provided for the supply of the blocking unit 10, the controller 80 and the thermal management unit 84.

The controller 80, thermal management unit 84 and the power supply 87 may be separated from the reception body 20 and the support 72. A user interface may be provided.

Figure 6:
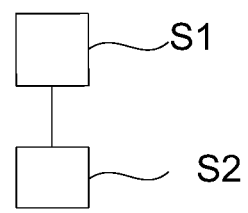
FIG. 6 shows a workflow of a curing process according to an embodiment of the present invention.

FIG. 6 shows a workflow of the curing process with the blocking unit 10 as illustrated in FIGS. 1-5.

In a first step S1, a pattern of illumination is determined for the curing. The pattern of illumination determines the sequential switching of the light sources of the plurality of light sources 51,52. The controller 80 sets a starting time, duration and intensity of illumination, for each one of the plurality of light sources. The pattern of illumination is defined to minimize shrinkage and stresses induced during curing. Different parameters may be taken into account when determining the pattern of illumination, including but not limited thereto a geometrical parameters such as the geometry of the lens, the geometry of the block piece, a thickness profile of the material to cure, as well as optical parameters such as a nature of the material to cure, the absorption properties of the block piece and lens parameters.

In a second step S2, the light sources are sequentially switched on or off based on the determined pattern.

This step S2 is illustrated on FIGS. 7a-7h for a first example of pattern of illumination or on FIGS. 8a-8h for another example pattern of illumination. Those light sources of the first and second pluralities of light sources 51, 52 which are turned on are marked as a star on FIGS. 7a-7h and 8a-8h.

The first pattern illustrated on FIGS. 7a-7h consists in beginning the curing in the center, i.e. starting with the central light sources of the first light sources 51 and progressing towards the outside. The skilled person will understand that the first pattern illumination allows the hardening of the curing material where the light sources are switched on and the migration of the still fluid curing material or monomer of material from the outside. Critical zones having less curing material or at edges of bifocal lenses may be pre-illuminated and cured first. The surroundings monomers are allowed to flow without creating tensions.

The other pattern illustrated on FIGS. 8a-8h consists in beginning the curing on one side and progressing towards the other side. The pattern illustrated on FIGS. 8a-8h may be chosen for the curing of a prism, starting from a thin side of the prism towards the thicker section of the prism.

Of course, the two illustrated patterns are for explanations only and are not intended for limiting the invention.

The skilled person will understand that curing form the center towards the outside or from one side towards the other side allows uncured material to flow towards the cured area—as represented by the arrows in the FIGS. 7 and 8. This flow of material minimizes the stresses induced by shrinkage. It is essential for the strategy of initializing the curing, that the curing does not leave zones of trapped uncured adhesive. Such trapped cavities of uncured adhesive would create a strong shrinkage induced distortion once this material polymerizes.

When thin areas require less cure time than the thicker areas, the UV energy in these areas can be turned off much sooner, thus minimizing the temperature increase otherwise caused by "over-curing".

It has been shown that for layers of UV curing adhesive material, which are in contact with the oxygen in the ambient atmosphere, e.g. upper layer and circumferential layers, the curing is less efficient for the material in contact with oxygen, due to chemical reaction with oxygen. As a result, some uncured adhesive material remains, which can lead to undue contamination in the cleaning and coating steps following the curing step during the further processing of the ophthalmic lens. The plurality of second light sources 52, at the top of the reception body, irradiates in the radial direction and therefore helps curing the remaining outer layers of material.

The present invention therefore allows selectively curing as desired and/or required.

LIST OF REFERENCE NUMBERS 2 block piece
10 blocking unit
12 bottom portion (reception body)
15 reception part (reception body)
18 top part (reception body)
20 reception body
22 reception surface
23 upper central reception surface
24 transition surface
25 lower central reception surface
26 reception space
28 top peripheral wall
30 clamping mechanism
31 clamping portions
32 clamping ring
33 guiding notch
35 adapter ring
36 air hole
38 axis alignment bar
42 through-hole (light guide)
51 first light sources
52 second light sources
72 support
80 controller
84 thermal management unit
85 cooling plate
86 coolant connection (inlet/outlet)
87 power supply
88 longitudinal slot
89 flexible clamping tab

The invention claimed is:

1. A blocking unit for a block piece for a spectacle lens comprising:
    a block piece reception body with a reception surface adapted to receive a block piece with a spectacle lens to be blocked and a bottom surface opposite the reception surface; and
    a plurality of light sources fixedly mounted to the block piece reception body;
wherein the blocking unit comprises a controller for individually controlling the light sources of the plurality of light sources.

2. The blocking unit according to claim 1, further comprising a second group of second light sources arranged to irradiate towards the top of the block piece.

3. A blocking unit for a block piece for a spectacle lens comprising:
    a block piece reception body with a reception surface adapted to receive a block piece with a spectacle lens to be blocked and a bottom surface opposite the reception surface; and
    a plurality of light sources fixedly mounted to the block piece reception body, the plurality of light sources comprising:
        a first group of first light sources arranged at the bottom of the block piece reception body; and
        a second group of second light sources arranged to irradiate towards the top of the block piece.

4. The blocking unit according to claim 3, comprising a controller for individually controlling the light sources of the plurality of light sources.

5. The blocking unit according to claim 1, wherein the blocking unit comprises a support, and wherein the block piece reception body and at least a first group of the plurality of light sources are mounted to the support.

6. The blocking unit according to claim 1, wherein the light sources are LED light sources.

7. The blocking unit according to claim 1, wherein the plurality of light sources comprises a first group of first light sources arranged at the bottom of the block piece reception body, wherein the first light sources are arranged to irradiate in a direction mainly vertical to the bottom surface, towards the reception surface.

8. The blocking unit according to claim 5, wherein the second light sources are arranged to irradiate in a radial direction, towards the center of the block unit.

9. The blocking unit according to claim 5, wherein the second light sources are arranged on an internal peripheral wall above the reception surface.

10. The blocking unit according to claim 1, wherein the block piece reception body comprises a plurality of through-holes, the through holes being arranged between the bottom surface and the reception surface, in particular being arranged to guide light emitted from the first group of first light sources.

11. The blocking unit according to claim 1, comprising cooling elements to prevent overheating of the blocking unit, in particular to prevent overheating of the light sources.

12. The blocking unit according to claim 1, wherein the block piece reception body comprises an interchangeable insert for receiving blockpiece types of different standards.

13. A process of curing a lens on a block piece, comprising the steps of
defining, in a controller, a pattern of illumination,
sequentially turning on and off the light sources from a plurality of first light sources and optional second light sources based on the determined pattern, for curing a material between the lens and the block piece, wherein the light sources of the plurality of light sources are individually controlled.

14. A process of curing a lens on a block piece, comprising the steps of
defining, in a controller, a pattern of illumination,
sequentially turning on and off the light sources from a plurality of first light sources and second light sources based on the determined pattern, for curing a material between the lens and the block piece, wherein the second light sources arranged to irradiate towards the top of the block piece.

15. The process according to claim 13, comprising first turning on first light sources located in the center of the blocking unit and sequentially turning on the neighboring light sources in the outward direction.

16. The process according to claim 13, comprising first turning on first light sources located on one side of the blocking unit and then sequentially turning on the neighboring light sources towards the other side of the blocking unit.

17. The process according to claim 13, wherein the pattern depends on at least one of a geometry of the lens, a thickness of the curing material, a gradient of thickness of the lens, a gradient of thickness of the curing material, a composition of the curing material.

18. The process according to claim 13, wherein the defining of the pattern comprises determining a sequence controlled in time and intensity which depends on at least one of a geometry of the lens, the refractive index of the lens, the thickness profile of the curing material, the refractive index of the curing material, the refractive index and transmission of the block piece, and the transmission of the lens.

19. The process according to claim 13, further comprising the step of inserting the block piece into a blocking unit comprising:
a block piece reception body with a reception surface adapted to receive a block piece with a spectacle lens to be blocked and a bottom surface opposite the reception surface
a plurality of light sources fixedly mounted to the block piece reception body,
wherein the blocking unit comprises a controller for individually controlling the light sources of the plurality of light sources.

* * * * *